United States Patent
Mølgaard et al.

(10) Patent No.: US 10,533,473 B2
(45) Date of Patent: Jan. 14, 2020

(54) EXHAUST GAS TREATMENT SYSTEM AND METHOD, AS WELL AS SHIP COMPRISING, AND USE OF, SUCH A SYSTEM

(71) Applicant: ALFA LAVAL CORPORATE AB, Lund (SE)

(72) Inventors: Søren Mølgaard, Støvring (DK); Kenneth Christensen, Saeby (DK)

(73) Assignee: ALFA LAVAL CORPORATE AB, Lund (SE)

( * ) Notice: Subject to any disclaimer, the term of this patent is extended or adjusted under 35 U.S.C. 154(b) by 199 days.

(21) Appl. No.: 15/538,536

(22) PCT Filed: Dec. 11, 2015

(86) PCT No.: PCT/EP2015/079411
§ 371 (c)(1),
(2) Date: Jun. 21, 2017

(87) PCT Pub. No.: WO2016/102211
PCT Pub. Date: Jun. 30, 2016

(65) Prior Publication Data
US 2017/0362985 A1   Dec. 21, 2017

(30) Foreign Application Priority Data
Dec. 22, 2014   (EP) .................................. 14199534

(51) Int. Cl.
*F01N 3/20*   (2006.01)
*F23J 15/04*   (2006.01)
(Continued)

(52) U.S. Cl.
CPC ........... *F01N 3/2066* (2013.01); *B01D 53/75* (2013.01); *B01D 53/9418* (2013.01); *F23J 15/04* (2013.01);
(Continued)

(58) Field of Classification Search
CPC ........ B01D 53/50; B01D 53/75; B01D 53/78; B01D 53/9418; B01D 2251/2067;
(Continued)

(56) References Cited

U.S. PATENT DOCUMENTS 50,222,226   6/1991   Bell
5,118,282 A   6/1992   Reynolds et al.
(Continued)

FOREIGN PATENT DOCUMENTS

CN   101553648 B   8/2011
EP   0 423 417 A1   4/1991
(Continued)

OTHER PUBLICATIONS

International Search Report (PCT/ISA/210) dated Mar. 3, 2016, by the European Patent Office as the International Searching Authority for International Application No. PCT/EP2015/079411.
(Continued)

Primary Examiner — Jason D Shanske
Assistant Examiner — Matthew T Largi
(74) Attorney, Agent, or Firm — Buchanan Ingersoll & Rooney PC

(57) ABSTRACT

A system for treating engine exhaust gas, which engine exhaust gas has a temperature of between T1 and T2, comprises a SCR reactor for converting NOx in a medium containing the engine exhaust gas into N2 and H2O. The SCR reactor has an inlet for receiving the medium and an outlet for outputting the NOx reduced medium. A first boiler unit has an outlet for outputting boiler exhaust gas (temperature greater than T3, T3>T1) from the first boiler unit. A mixing unit mixes the engine exhaust gas with the boiler exhaust gas to produce the medium. The mixing unit has a first inlet communicating with the engine for receiving the engine exhaust gas, a second inlet communicating with the
(Continued)

outlet of the first boiler unit for receiving the boiler exhaust gas and an outlet for outputting the medium. The mixing unit outlet communicates with the inlet of the SCR reactor.

20 Claims, 5 Drawing Sheets

(51) Int. Cl.
*B01D 53/75* (2006.01)
*B01D 53/94* (2006.01)
*B01D 53/56* (2006.01)

(52) U.S. Cl.
CPC ...... *B01D 53/56* (2013.01); *B01D 2251/2067* (2013.01); *B01D 2259/4566* (2013.01); *F01N 2590/02* (2013.01); *F01N 2610/02* (2013.01); *F23J 2219/10* (2013.01)

(58) Field of Classification Search
CPC ... B01D 2259/4566; B01D 53/56; F01K 5/00; F01N 3/0205; F01N 3/04; F01N 3/2006; F01N 3/2066; F01N 5/02; F01N 2240/02; F01N 2590/02; F01N 2610/02; F23J 15/04; F23J 2219/10; F23J 2219/40
See application file for complete search history.

(56) References Cited

U.S. PATENT DOCUMENTS

| | | | | |
|---|---|---|---|---|
| 5,133,298 A * | 7/1992 | Ahnger | ................ | F01K 23/065 122/7 R |
| 5,985,222 A * | 11/1999 | Sudduth | ................ | B01D 53/56 423/235 |
| 6,301,890 B1 * | 10/2001 | Zeretzke | ................ | F01K 23/065 60/597 |
| 6,837,702 B1 * | 1/2005 | Shelor | ................ | F01N 3/26 431/5 |
| 7,275,366 B2 | 10/2007 | Powell et al. | | |
| 8,061,123 B2 | 11/2011 | Driscoll et al. | | |
| 2009/0004082 A1 * | 1/2009 | Takahashi | ......... | B01D 53/9409 423/239.1 |
| 2009/0053122 A1 * | 2/2009 | Kanda | ................ | B01D 53/60 423/239.1 |
| 2009/0120080 A1 | 5/2009 | Kim et al. | | |
| 2010/0146949 A1 * | 6/2010 | Stobart | .............. | B60H 1/00492 60/300 |
| 2012/0234264 A1 * | 9/2012 | Benz | ....................... | F01K 17/02 123/3 |
| 2013/0098462 A1 * | 4/2013 | Hoskin | ................ | F17D 3/00 137/3 |
| 2014/0090356 A1 * | 4/2014 | Nakamura | ............... | F23N 5/00 60/39.182 |
| 2015/0292379 A1 | 10/2015 | Molgaard et al. | | |

FOREIGN PATENT DOCUMENTS

| | | |
|---|---|---|
| EP | 2 065 570 A2 | 6/2009 |
| EP | 2 505 793 A1 | 10/2012 |
| EP | 2 628 913 A1 | 8/2013 |
| JP | H05-505661 A | 8/1993 |
| JP | 2010-513766 A | 4/2010 |
| JP | 2012-082804 A | 4/2012 |
| KR | 10-0763002 B1 | 10/2007 |
| KR | 10-2013-0127737 A | 11/2013 |
| RU | 151 927 U1 | 4/2015 |
| WO | 91/14857 A1 | 10/1991 |
| WO | WO 2008/135059 A1 | 11/2008 |
| WO | WO 2013/035894 A1 | 3/2013 |
| WO | WO 2014/135509 A1 | 9/2014 |

OTHER PUBLICATIONS

Written Opinion (PCT/ISA/237) dated Mar. 3, 2016, by the European Patent Office as the International Searching Authority for International Application No. PCT/EP2015/079411.
Office Action (Notice of Reasons for Refusal) dated Jul. 13, 2018, by the Japanese Patent Office in corresponding Japanese Patent Application No. 2017-550993, and an English Translation of the Office Action. (8 pages).
An English Translation of the Office Action (Decision to Grant) dated Jul. 20, 2018, by the Federal Service for Intellectual Property in corresponding Russian Patent Application No. 2017126020/ (044801). (6 pages).
An English Translation of the First Office Action dated Sep. 5, 2018, by the State Intellectual Property Office of the Peoples Republic of China in corresponding Chinese Patent Application No. 2015800700393. (9 pages).

\* cited by examiner

EXHAUST GAS TREATMENT SYSTEM AND METHOD, AS WELL AS SHIP COMPRISING, AND USE OF, SUCH A SYSTEM

TECHNICAL FIELD

The invention relates to a system and a method for treatment of engine exhaust gas from an engine. The invention also relates to a ship comprising such a system and a use of such a system onboard a ship.

BACKGROUND ART

Different methods for reducing the content of nitrogen oxides, hereinafter referred to as $NO_x$, in exhaust gas from engines are known. One such method is Selective Catalytic Reduction, hereinafter referred to as SCR, through which $NO_x$ in the exhaust gas is converted into nitrogen $N_2$ and water $H_2O$ by means of a catalyst. More particularly, ammonia or urea is added to the exhaust gas before this is fed through a SCR reactor, which contains a catalyst, for $NO_x$ decomposition. SCR reactors are well known within the art and will not be described in detail herein.

Depending on different factors such as the contents of the exhaust gas and the properties of the catalyst, there is a minimum temperature of the exhaust gas for proper $NO_x$ reduction/decomposition/conversion to take place. This minimum temperature is typically around 330° C. Depending on type and load of the engine, the temperature of the exhaust gas may vary within an interval $T_1$-$T_2$, where $T_1$<330° C. To enable proper $NO_x$ reduction within the complete temperature interval, a heating unit for heating the exhaust gas above 330° C. may be provided. In prior art document WO 2008/135059 a system comprising a SCR reactor and a heating unit for increasing the exhaust gas temperature is described.

The provision of a heating unit for increasing the exhaust gas temperature is a simple and effective, but rather expensive, solution. Thus, within the art, room for improvement exists.

SUMMARY

An object of the present invention is to remove, in a system for exhaust gas treatment, the need for an apparatus having the sole task of increasing the exhaust gas temperature when so is required. The basic concept of the invention is to heat engine exhaust gas by means of exhaust gas from a boiler, which boiler can be used for additional purposes. Other objects of the present invention are to provide a ship comprising such a system, use of such a system and an improved method for exhaust gas treatment. The system, ship, use and method for achieving the objects above are defined in the appended claims and discussed below.

According to the present invention, a system for treatment of engine exhaust gas from an engine, which engine exhaust gas has a temperature of between $T_1$ and $T_2$, comprises a SCR reactor for converting $NO_x$ contained in a medium into $N_2$ and $H_2O$ to obtain a medium with a reduced $NO_x$ content. The medium contains the engine exhaust gas. The SCR reactor has an inlet for receiving the medium and an outlet for outputting the $NO_x$ reduced medium. The system is characterized in that it further comprises a mixing unit and a first boiler unit. The first boiler unit has a first outlet for outputting boiler exhaust gas from the first boiler unit. This boiler exhaust gas has a temperature of $T_3$ or more, where $T_3$ is larger than $T_1$. The mixing unit is arranged to mix the engine exhaust gas with the boiler exhaust gas to produce the medium. The mixing unit has a first inlet communicating with the engine for receiving the engine exhaust gas and a second inlet communicating with the first outlet of the first boiler unit for receiving the boiler exhaust gas. Further, the mixing unit has an outlet for outputting the medium, which outlet communicates with the inlet of the SCR reactor.

In accordance with the present invention, when the engine exhaust gas is not sufficiently hot for proper $NO_x$ reduction to take place when the engine exhaust gas is passed through the SCR reactor, boiler exhaust gas may be mixed with the engine exhaust gas into a medium hot enough for proper $NO_x$ reduction when the medium is passed through the SCR reactor. Besides the boiler exhaust gas the first boiler unit may produce steam that can be used in other applications. In that the boiler exhaust gas may be contained in the medium which passes through the SCR reactor, not only the engine exhaust gas, but also the boiler exhaust gas, may be cleaned from $NO_x$. Thus, the system is environment friendly without requiring separate cleaning equipment for cleaning of the boiler exhaust gas.

The system may further comprise a second boiler unit for recovering heat from the medium, which results in cooling of the medium. The second boiler unit may have a first inlet communicating with the outlet of the SCR reactor for receiving the $NO_x$ reduced medium. Further, the second boiler unit may have a first outlet for outputting the cooled $NO_x$ reduced medium. In that the boiler exhaust gas may be contained in the medium which passes through the second boiler unit, this embodiment implies that heat may be recovered, not only from the engine exhaust gas, but also from the boiler exhaust gas. Thus, energy produced by the engine as well as the first boiler unit is not wasted but may be used for other purposes.

In case of the system comprising a second boiler unit, a second inlet of the second boiler unit may be connected to a second outlet of the first boiler unit, and a second outlet of the second boiler unit may be connected to a second inlet of the first boiler unit, to enable circulation of water between the second boiler unit and the first boiler unit. The water may be in different states so as to contain liquid and/or steam. Such an embodiment means that the first and second boiler units share water system which enables a saving in equipment and thus in cost. The first boiler unit may be a fired boiled unit, e.g. an oil fired boiler unit. Thereby, boiler exhaust gas having a temperature well above a minimum temperature for proper $NO_x$ conversion inside the SCR reactor may be generated, such that production of medium having a temperature above said minimum temperature is enabled.

The system may comprise a temperature sensor for estimating a temperature of the medium before it enters the SCR reactor. Such a temperature sensor enables determination of whether the medium has a temperature that enables proper $NO_x$ conversion inside the SCR or not.

Further, the system may comprise a control unit arranged to communicate with the temperature sensor and control the first boiler unit in response to an output of the temperature sensor. Such an embodiment makes it possible to operate the first boiler unit as required depending on the existing circumstances. As an example, during high engine load, the engine exhaust gas may have a temperature high enough for proper $NO_x$ conversion in the SCR reactor such that no mixing with boiler exhaust gas is required. In such a case, operation of the first boiler unit may not be necessary, at least not for raising the temperature of the medium fed to the SCR reactor.

As used herein, the terms "communicate" and "communicating" are meant to cover "communicate" and "communicating" directly as well as indirectly.

The system may be such that the boiler exhaust gas temperature is 360° C. or more, i.e. $T_3=360°$ C., which is well above the typical minimum temperature for proper $NO_x$ conversion of around 330° C. For example, such a boiler exhaust gas temperature may be achieved by means of a low efficiency first boiler unit.

A ship according to the present invention comprises a system as described above. Further, a use according to the present invention, concerns use of the above system onboard a ship. For the inventive ship and use, the engine producing the engine exhaust gas may be the main ship engine, e.g. a diesel engine producing exhaust gas of a temperature between $T_1=200°$ C. and $T_2=340°$ C., inter alia depending on engine load. Typically, onboard a ship, large amounts of steam are consumed, which steam may be produced by the first, and possibly the second, boiler unit. Thus, the same piece of equipment that provides the ship with necessary steam may be used to assure that proper $NO_x$ conversion takes place in the SCR reactor.

According to the present invention, a method of treating engine exhaust gas from an engine, which engine exhaust gas has a temperature of between $T_1$ and $T_2$, comprises the following steps: receiving a medium containing the engine exhaust gas in an SCR reactor, converting, in the SCR reactor, $NO_x$ contained in the medium into $N_2$ and $H_2O$, and outputting, from the SCR reactor, the $NO_x$ reduced medium. The method is characterized in further comprising the steps of outputting, from the first boiler unit, boiler exhaust gas having a temperature of $T_3$ or more, $T_3>T_1$, receiving, in a mixing unit the engine exhaust gas and the boiler exhaust gas, mixing, in the mixing unit, the engine exhaust gas and the boiler exhaust gas to produce said medium, and outputting, from the mixing unit, said medium.

Different embodiments of the inventive method are presented in the dependent method claims.

The above discussed advantages with different embodiments of the inventive system are naturally transferable to the inventive ship, use and method according to the invention.

Still other advantages, objectives, features and aspects of the invention will appear from the following detailed description as well as from the drawings.

BRIEF DESCRIPTION OF THE DRAWINGS

The invention will now be described in more detail with reference to the appended schematic drawings, in which.

DETAILED DESCRIPTION OF ONE EMBODIMENT OF THE INVENTION

Figure 1:
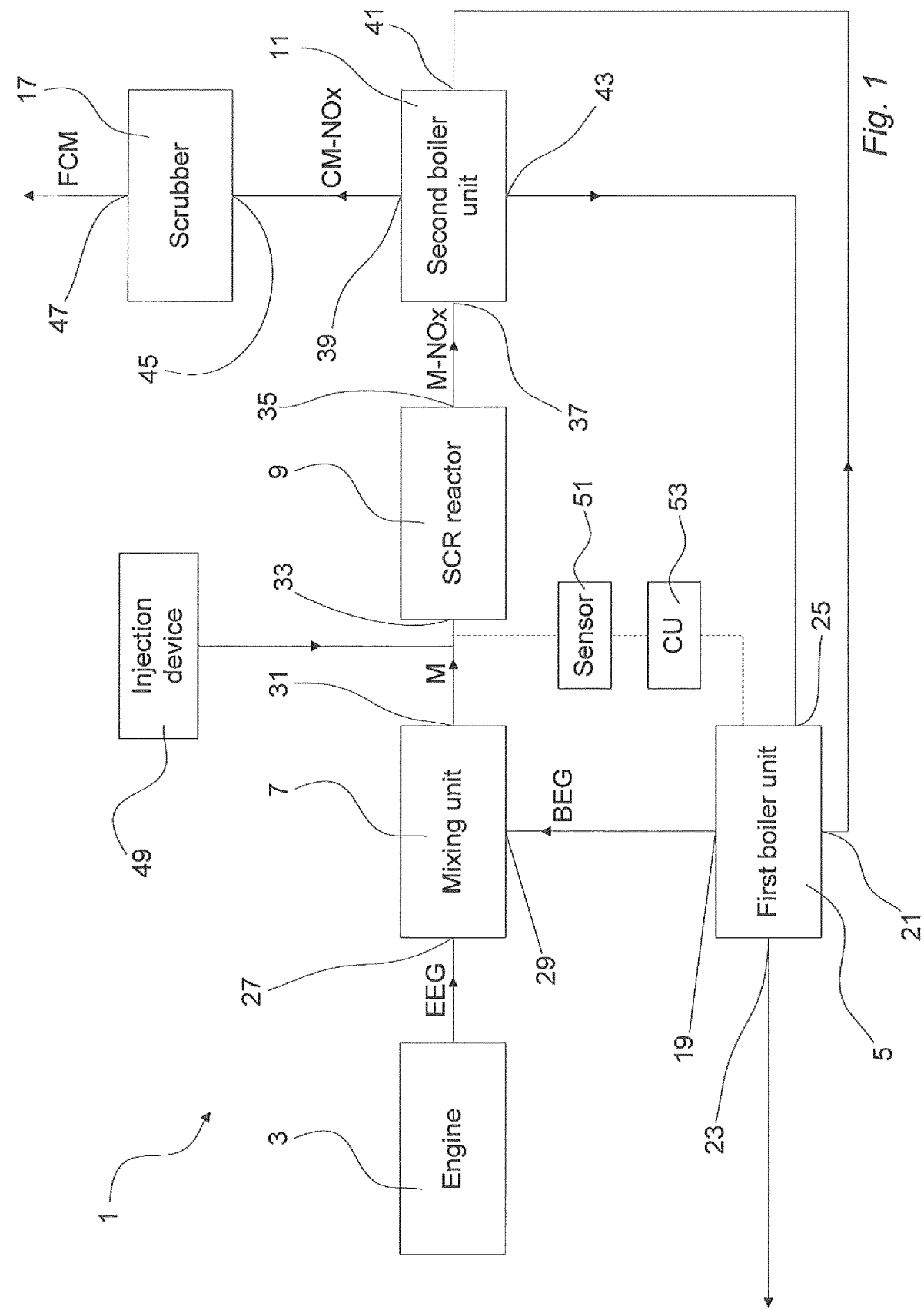
FIG. 1 is a block diagram schematically illustrating a system according to the invention, FIGS. 2a, 2b and 2c contain a flow chart illustrating the method according to the invention.

With reference to FIG. 1 a system 1 for treatment of engine exhaust gas EEG from an engine 3 is shown, which system is installed onboard a ship (not illustrated). The engine 3 is the main ship diesel engine producing engine exhaust gas EEG containing $NO_x$ and having a temperature of between $T_1=200°$ C. and $T_2=340°$ C. The system 1 comprises a first boiler unit 5, a mixing unit 7, an SCR (Selective Catalytic Reduction) unit 9, a second boiler unit 11 and a scrubber 17.

The first boiler unit 5 is oil fired and comprises a smoketube boiler of low efficiency type with an efficiency of between 80% and 85%. It produces boiler exhaust gas BEG containing $NO_x$ and having a temperature >330° C., here a temperature between $T_3=360°$ C. and $T_4=400°$ C., which exhaust gas leaves the first boiler unit 5 through a first outlet 19 of the same. The first boiler unit further has a second outlet 21 for outputting liquid water, a third outlet 23 for outputting water steam for use onboard the ship, and a second inlet 25 for receiving liquid water and water steam. Also, the first boiler unit has a first inlet (not illustrated or further discussed) for infeed of fuel, i.e. oil.

The mixing unit 7 is formed as a pipe extending between the engine 3 and the SCR reactor 9, inside which pipe a static mixing unit, in the form of a number of baffles sized and arranged so as to promote effective gas mixing, is arranged. It has a first inlet 27 communicating with the engine 3 for receiving engine exhaust gas EEG and a second inlet 29 communicating with the first outlet 19 of the first boiler unit 5 for receiving the boiler exhaust gas BEG. The engine exhaust gas EEG and the boiler exhaust gas BEG are mixed into a medium M during their passage through the mixing unit 7. Accordingly, the mixing unit 7 further has an outlet 31 for outputting the medium M.

The SCR reactor 9 comprises a channel structure with surfaces coated with a catalyst, here vanadium oxides, for converting $NO_x$ into nitrogen $N_2$ and water $H_2O$ during passage of the medium M through the channels. The SCR reactor 9 is such that the medium M must have a temperature above $T_5=330°$ C. for proper $NO_x$ conversion inside the SCR reactor 9 to be possible. The SCR reactor 9 has an inlet 33 communicating with the outlet 31 of the mixing unit 7 for receiving the medium M. Further, the SCR reactor 9 has an outlet 35 for outputting $NO_x$ reduced medium M-$NO_x$.

The second boiler unit 11 is provided for purposes of recovering heat from the medium. It has a first inlet 37 communicating with the outlet 35 of the SCR reactor 9 for receiving the $NO_x$ reduced medium M-$NO_x$ and a first outlet 39 for outputting cooled $NO_x$ reduced medium CM-$NO_x$. Further, the second boiler unit 11 has a second inlet 41 communicating with the second outlet 21 of the first boiler unit 5 for receiving liquid water, and a second outlet 43 communicating with the second inlet 25 of the first boiler unit 5 for outputting liquid water and water steam. Thus, water is circulating between the first and second boiler units 5 and 11.

The scrubber 17 is provided for purposes of cleaning the medium, that is not only the engine exhaust gas EEG, but also the boiler exhaust gas BEG, further, especially from sulphur oxides $SO_x$ and particular matter such as soot, oil and heavy metal particles. Scrubbers as such are well known within the art and will not be described in detail herein. As an example, the scrubber 17 may be of the type described in WO 2014/135509. The scrubber 17 has an inlet 45 communicating with the first outlet 39 of the second boiler unit 11 for receiving the cooled NO reduced medium CM-$NO_x$. Further, the scrubber 17 has an outlet 47 for outputting the further cleaned medium FCM.

Additionally, the system 1 comprises an injection device 49 for adding urea to the medium when this is fed from the mixing unit 7 to the SCR reactor 9. When added to the relatively hot medium M, the urea is heated whereby ammonia is generated. The ammonia supplements the catalytic reaction that takes place inside the SCR reactor 9. More particularly, the ammonia acts as a "reduction agent" which enables the conversion of NO in the medium to nitrogen and water. It should be stressed that, herein, the expression "medium" is used for the exhaust gas mixture irrespective of whether it contains, or does not contain, urea, ammonia or products thereof.

Furthermore, the system 1 comprises a temperature sensor 51 and a control unit (CU) 53. The temperature sensor is arranged to measure a temperature of the medium M just before it enters the SCR reactor 9. The control unit 53 is arranged to communicate with the temperature sensor 51 and the first boiler unit 5 and control the operation of the first boiler unit in response to an output, in the form of the measured temperature of the medium M, of the temperature sensor 51.

Figure 2A:
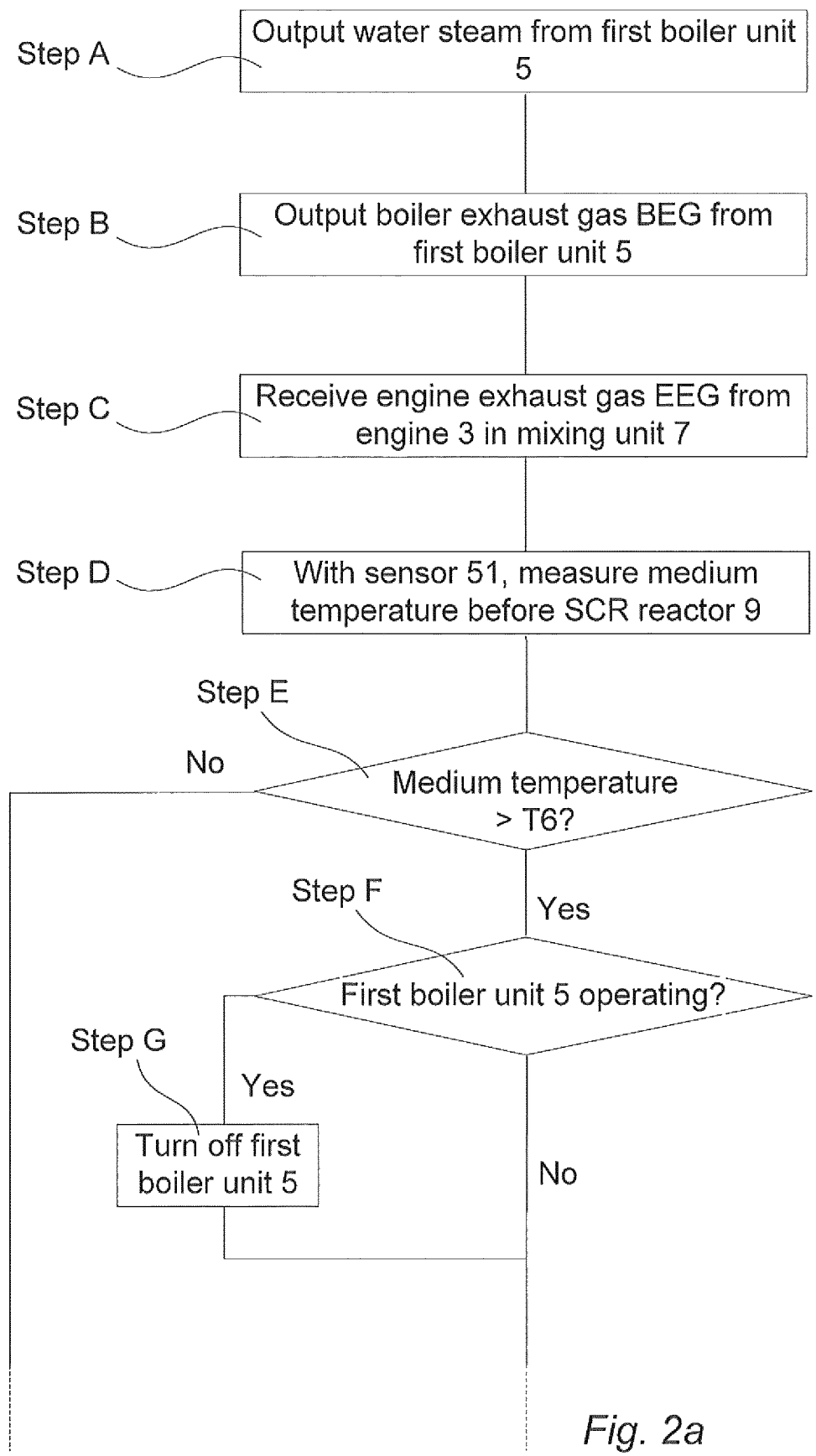
Figure 2B:
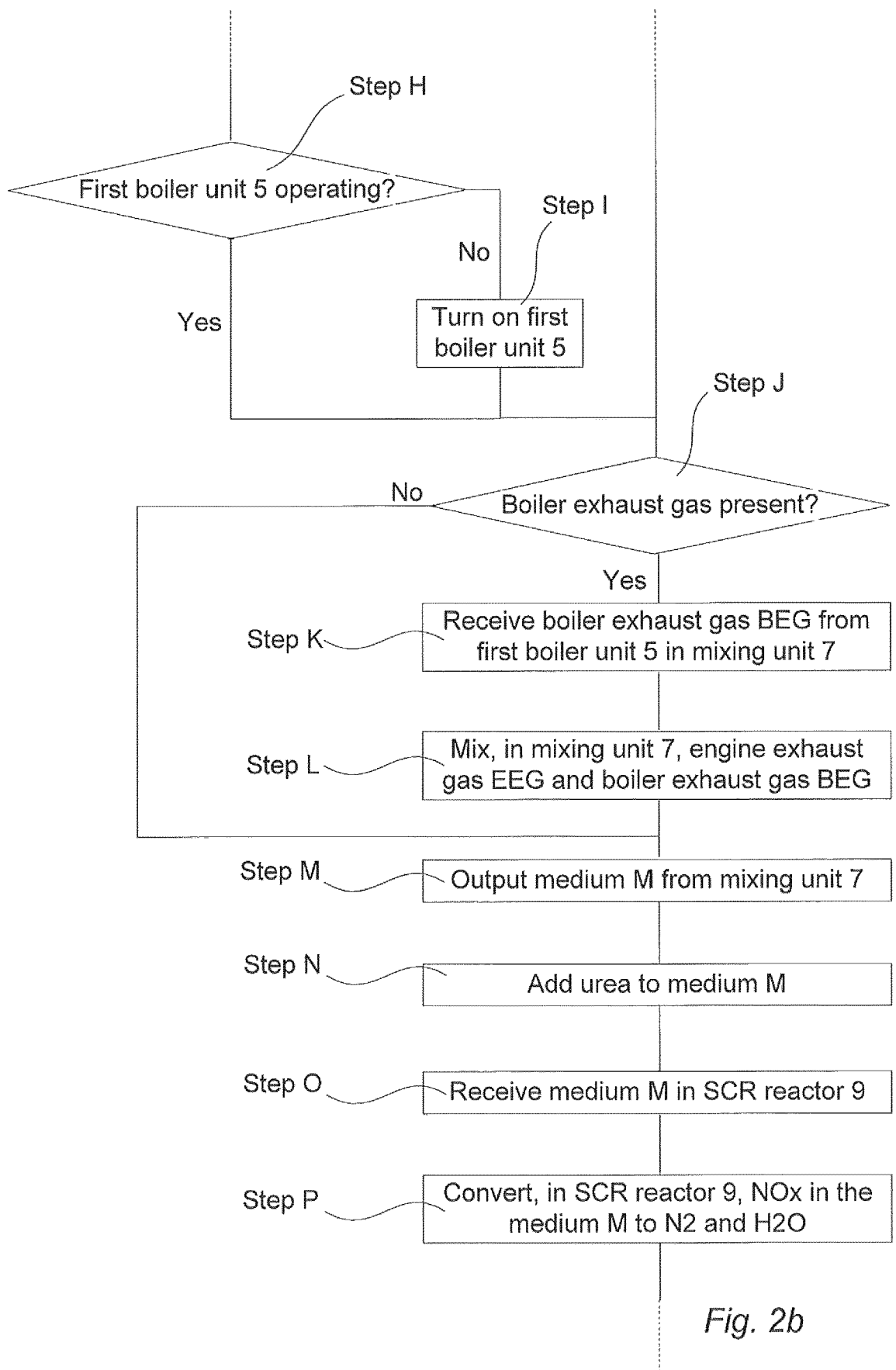
Figure 2C:
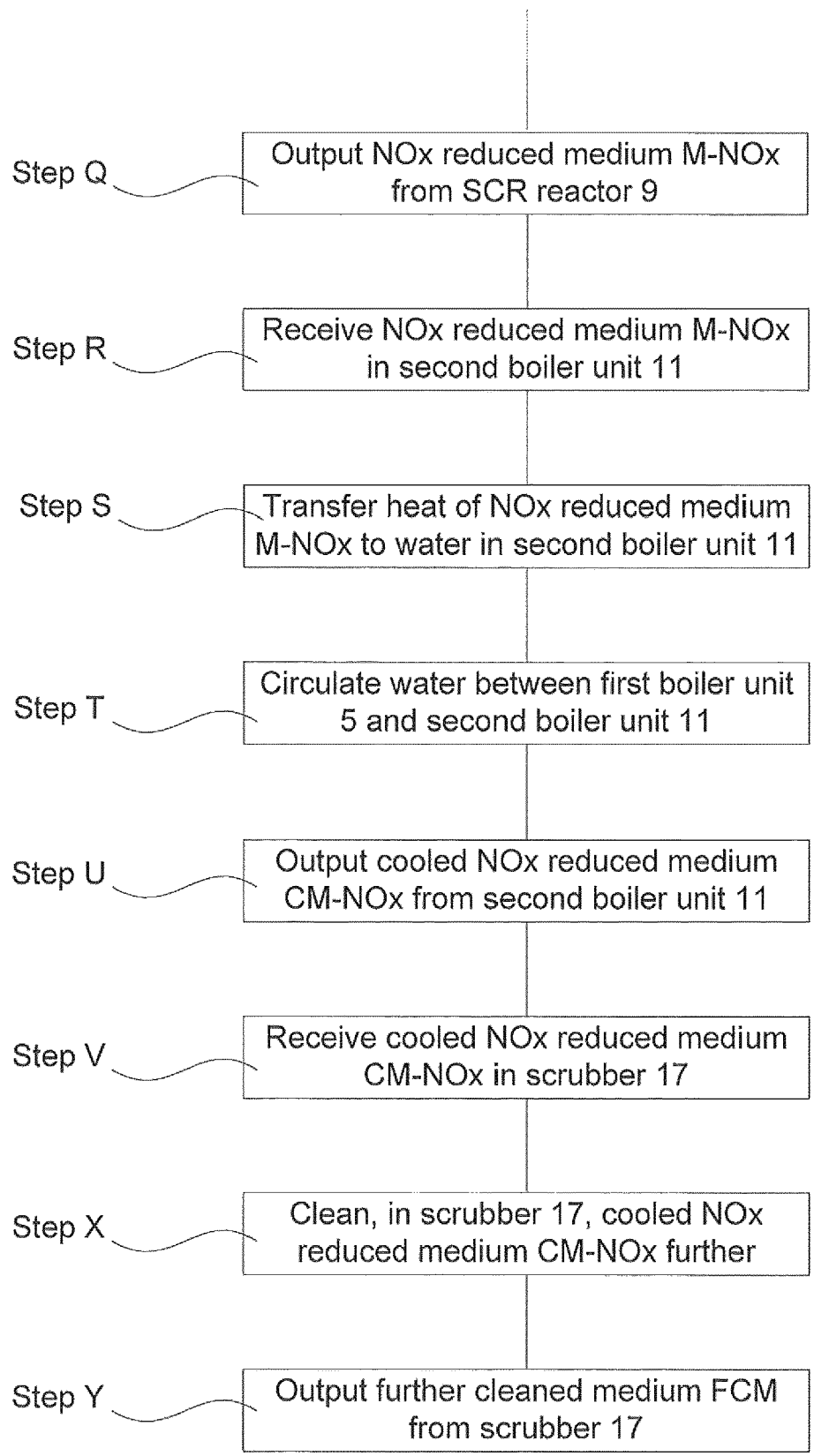

Thus, the above system 1 is used onboard a ship. The system 1 is further discussed below together with a method of treating engine exhaust gas EEG from the engine 3, which method is illustrated by the flow chart of FIGS. 2a, 2b and 2c.

As above described, the first boiler unit 5 outputs water steam (Step A) which may be used in different applications onboard the ship, as well as boiler exhaust gas BEG (Step B) which may be used for heating the engine exhaust gas EEG. The first boiler unit 5 is operated primarily when the ship is in the harbor and the engine is not running (for steam production), and when the engine 3 is running at low load, e.g. close to the coast. When the engine runs at low load, the temperature of the generated engine exhaust gas EEG is relatively low and then heating of the engine exhaust gas by means of the boiler exhaust gas is typically necessary to obtain a medium sufficiently hot for proper $NO_x$ conversion inside the SCR reactor.

During operation of the engine 3, the engine exhaust gas EEG is fed from the engine 3 to the mixing unit 7 (Step C). A medium M is fed out from the mixing unit 7 (Step M). The content of medium M depends on how hot the engine exhaust gas EEG is. If the engine exhaust gas EEG is relatively hot, the medium M may consist of engine exhaust gas only. However, if the engine exhaust gas EEG is relatively cool, the medium M may be a mixture of engine exhaust gas and boiler exhaust gas BEG.

The temperature of the medium just before it is fed into the SCR reactor 9 is measured by means of the sensor 51 (Step D). If the medium temperature is below or equal to a certain value $T_6$ (Step E), it is checked whether the first boiler unit 5 is operated or not (Step H). If not, the first boiler unit 5 is turned on (Step I). On the other hand, if the measured medium temperature is above $T_6$, it is checked whether the first boiler unit 5 is operated or not (Step F). If so, the first boiler unit 5 is turned off (Step G). Boiler exhaust gas will be present for a while after the first boiler unit 5 has been turned off and is cooling down. It is checked whether boiler exhaust gas BEG is present or not (Step J). If so, it is fed from the first boiler unit 5 to the mixing unit 7 (Step K) wherein it is mixed with engine exhaust gas EEG into the medium (Step L). Here, $T_6$ is equal to 330° C.

Before the medium M is received in the SCR reactor 9 from the mixing unit 7 (Step O) urea is added to the medium by means of the injection device 49 (Step N). Inside the SCR reactor 9 $NO_x$ contained in the medium M is converted to nitrogen and water (Step P). The $NO_x$ reduced medium M-$NO_x$ is fed from the SCR reactor 9 (Step Q) to the second boiler unit 11 (Step R) inside which heat from the $NO_x$ reduced medium M-$NO_x$ is transferred to the water inside the second boiler unit 11 (Step S). Thereby, the $NO_x$ reduced medium is cooled, to approximately 180° C. The first and second boiler units 5 and 11 share water system and communicate with each other as above described. Water is continuously circulated between the first and second boiler units 5 and 11 (Step T), liquid water being fed from the first boiler unit 5 to the second boiler unit 11 and liquid water and water steam being fed from the second boiler unit 11 to the first boiler unit 5.

The cooled $NO_x$ reduced medium CM-$NO_x$ is fed from the second boiler unit 11 (Step U) to the scrubber 17 (Step V) wherein it is further cleaned (Step X) as above described. Finally, the further cleaned medium FCM is output from the scrubber (Step Y) and fed through a chimney (not illustrated) into the atmosphere.

Although not illustrated in the figures, or described in detail herein, the medium fed out of the SCR reactor is analyzed. If the medium (M-$NO_x$) contains too much $NO_x$, more urea is added to the medium (M) before it enters the SCR reactor. For basic operation and until the system is stabilized, the urea feed is made according to predefined curves.

Figure 3:
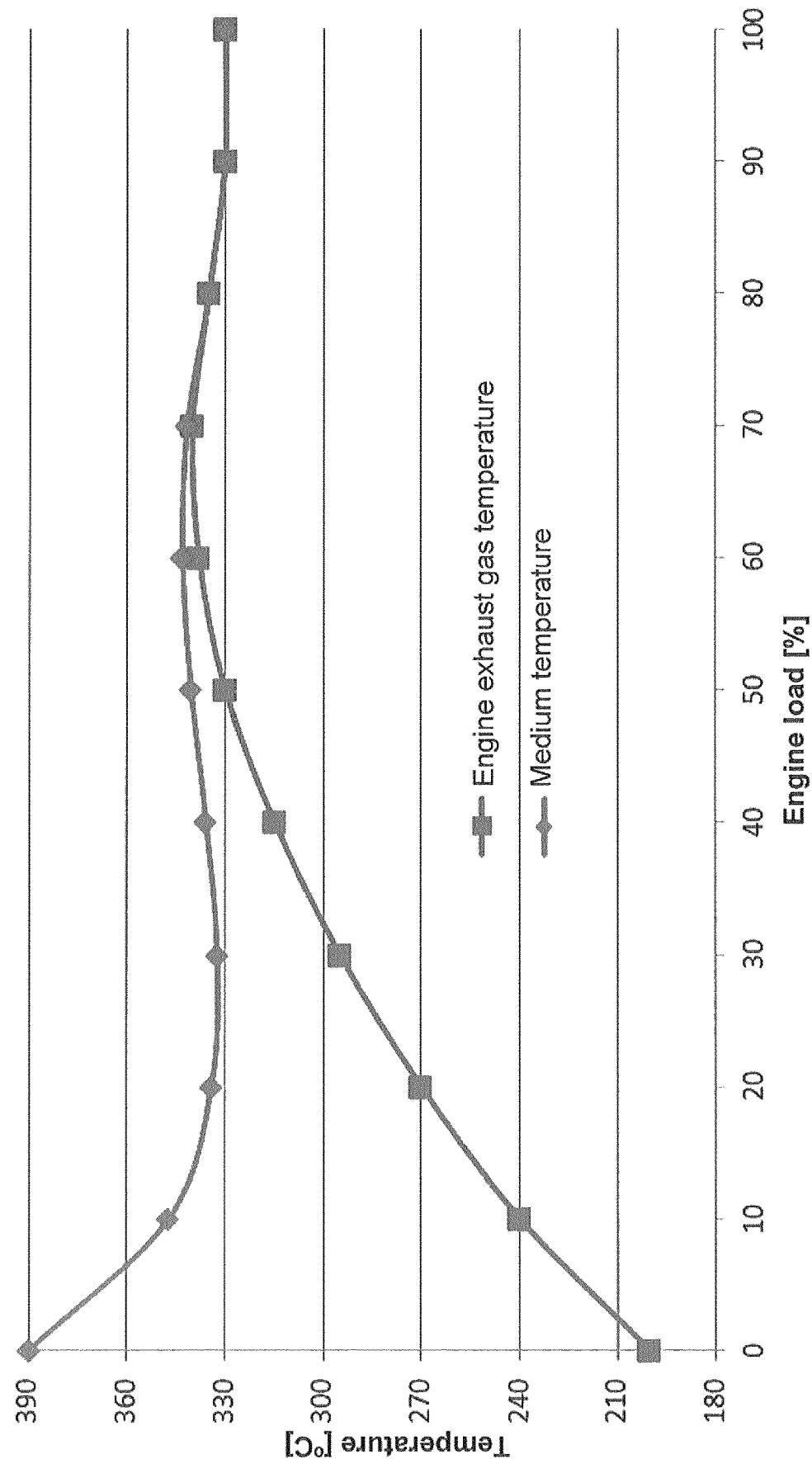
FIG. 3 is a diagram illustrating the effect of the invention.

FIG. 3 contains a diagram illustrating exhaust gas temperature as a function of engine load for a 4-stroke engine having an exhaust gas temperature in the range 200-340° C. The lower graph illustrates the engine exhaust gas temperature while the upper graph illustrates the medium temperature, the medium being a mixture of engine exhaust gas EEG and boiler (first boiler unit) exhaust gas BEG. The maximum boiler exhaust gas temperature is here 390° C. The relative gas mass is 80% engine exhaust gas, EEG, and 20% boiler exhaust gas 20%, BEG. At low engine load the boiler operates at 100%. At high engine load the boiler is turned off. The table below contains the parameter values that form the basis of the diagram in FIG. 3.

| Engine load (%) | EEG temp ° C. | Boiler load (%) | BEG temp ° C. | Medium temp ° C. |
|---|---|---|---|---|
| 0 | 200 | 100 | 390 | 390.0 |
| 10 | 240 | 100 | 390 | 347.1 |
| 20 | 270 | 95 | 388 | 334.1 |
| 30 | 295 | 85 | 385 | 332.3 |
| 40 | 315 | 75 | 380 | 335.7 |
| 50 | 330 | 60 | 375 | 340.4 |
| 60 | 338 | 45 | 370 | 343.1 |
| 70 | 340 | 25 | 360 | 341.6 |
| 80 | 335 | 0 | 0 | 335.0 |
| 90 | 330 | 0 | 0 | 330.0 |
| 100 | 330 | 0 | 0 | 330.0 |

From the diagram it is clear that the engine exhaust gas temperature is above 330° C. only at engine loads exceeding 50%. However, thanks to the hot boiler exhaust gas, the medium temperature is 330° C. or more at all times.

The above values are valid for a certain type of engine, a certain type of first boiler unit and a certain relative gas mass (80-20). Naturally, with alternative types of engines and first boiler units and with other relative gas masses, the above parameters could have other values. As an example, if the relative gas mass instead was 70% EEG and 30% BEG, the boiler load and thus the boiler exhaust gas temperature could be lowered without lowering the medium temperature.

Thus, in accordance with the present invention the exhaust gas from the ship engine 3 is heated, when necessary, by exhaust gas from the first boiler unit 5. Also, the first boiler unit 5 generates steam that can be used in different applications onboard the ship. The SCR reactor 9 and the scrubber 17 cleans, not only the exhaust gas from the engine 3, but also the exhaust gas from the first boiler unit 5 which is advantageous from an environmental aspect. Further, the second boiler unit 11 recovers heat, not only from the exhaust gas from the engine 3, but also from the exhaust gas from the first boiler unit 5, which is energy efficient and thus advantageous from an economical aspect.

The above described embodiment of the present invention should only be seen as an example. A person skilled in the art realizes that the embodiment discussed can be varied in a number of ways without deviating from the inventive conception.

Naturally, the inventive system and method could comprise additional components and steps, respectively, than above described. As an example, an additional mixing unit could be provided in between the injection device 49 and the SCR reactor 9 to ensure proper mixing of the urea/ammonia and the medium.

Similarly, the inventive system and method could comprise fewer components and steps, respectively, than above described. As an example, the system need not comprise a scrubber or a second boiler unit.

Above, mainly two different medium contents have been discussed; when the engine exhaust gas is sufficiently hot by itself, the medium M may contain engine exhaust gas only, and when the engine exhaust gas is not sufficiently hot by itself, the medium M may contain a mixture of engine exhaust gas and boiler exhaust gas. Naturally, if the first boiler unit 5 is operated and the engine 3 is not, the medium M may contain boiler exhaust gas only.

The injection device 49 may be arranged for addition of other substances containing nitrogen, N, and hydrogen, H, than urea, to the medium, e.g. ammonia directly.

Other substances than vanadium oxides may be used as the active catalytic material inside the SCR reactor 9.

In the above described system 1 the first boiler unit 5 is operated primarily when the engine 3 is not running, e.g. when the ship is in the harbor, and when the engine 3 is running at low load, e.g. close to the coast. Thereby, the SCR reactor 9 may be kept hot at all times, even when the engine 3 is not operated. Thereby, the time from start of the engine 3 until proper $NO_x$ conversion/reduction can be carried out inside the SCR reactor 9 can be minimized. This is important since said time typically elapses when the ship is close to the coast and the damage resulting from emissions may be the largest.

Instead of being intermittently operated as in the above described embodiment, the first boiler unit 5 may be operated, fully or partly, at all times.

The components of the inventive system need not be positioned as specified above and in the drawings. Also, the sensor 51 and the control unit 53 may be differently positioned. For example, the sensor could instead be located inside the SCR reactor or after the SCR reactor.

The mixing unit need not have the form of a pipe housing baffles but may have another, possibly more "sophisticated", construction, such as a construction involving movable gas mixing components.

The first boiler unit need not comprise a smoke-tube boiler but could instead comprise a water-tube boiler.

The first and second boiler units need not have one common water system but could instead have their own, separate water system.

The inventive system need not be used in connection with a ship diesel engine generating exhaust gas with a temperature between 200° C. and 340° C. as above, but it can be used in connection with other types of engines. Thus, the first boiler unit may produce exhaust gas having a different temperature range than the above specified one. Also the SCR reactor may be alternatively designed so as to provide a different smallest medium temperature for proper $NO_x$ conversion. The smallest medium temperature for proper $NO_x$ conversion is dependent on an engine fuel sulphur content, more sulphur typically resulting in a higher smallest medium temperature. In other words, $T_1$, $T_2$, $T_3$, $T_4$, $T_5$ and $T_6$ may have other values than the ones given above.

In the above described embodiment the medium temperature measured by means of the sensor 51 determines whether the first boiler 5 unit should be operated or not. According to an alternative embodiment, the amount of steam produced by the second boiler unit 11 instead determines whether the first boiler unit 5 should be operated or not. If the ship needs more steam than the second boiler unit 11 can supply, which typically occurs when the engine 3 is operated at low load or is completely shut off, then the first boiler unit is operated. Consequently, when the amount of steam produced by the second boiler unit is sufficient, the first boiler unit is not operated.

It should be stressed that the attributes first, second, third, etc. are used herein just to distinguish between species of the same kind and not to express any kind of mutual order between the species.

It should be stressed that the letters 'A', 'B', . . . are used herein just to distinguish between different method steps and not to express any kind of mutual order between the steps.

It should be stressed that a description of details not relevant to the present invention has been omitted and that the figures are just schematic and not drawn according to scale. It should also be said that some of the figures have been more simplified than others. Therefore, some components may be illustrated in one figure but left out on another figure.

The invention claimed is:

1. A system for treatment of engine exhaust gas from an engine, which engine exhaust gas has a temperature of between T1 and T2, the system comprising a SCR reactor for converting $NO_x$ contained in a medium containing the engine exhaust gas into $N_2$ and $H_2O$, the SCR reactor having an inlet for receiving the medium and an outlet for outputting the $NO_x$ reduced medium, further comprising a mixing unit and a first boiler unit, the first boiler unit having a first outlet for outputting boiler exhaust gas from the first boiler unit, which boiler exhaust gas has a temperature of T3 or more, T3>T1, the mixing unit being arranged to bring together and mix the engine exhaust gas with the boiler exhaust gas to produce said medium, the mixing unit having a first inlet communicating with the engine for receiving the engine exhaust gas, a second inlet communicating with the first outlet of the first boiler unit for receiving the boiler exhaust gas and an outlet for outputting said medium, the outlet of the mixing unit communicating with the inlet of the SCR reactor, all of the engine exhaust gas entering the mixing unit from the engine and all of the boiler exhaust gas entering the mixing unit from the first boiler unit being entirely separated from one another before entering the mixing unit such that all of the engine exhaust gas entering the mixing unit from the engine is first brought together with the boiler exhaust gas in the mixing unit.

2. The system according to claim 1, further comprising a second boiler unit for recovering heat from the medium, the second boiler unit having a first inlet communicating with the outlet of the SCR reactor for receiving the $NO_x$ reduced medium and a first outlet for outputting the cooled $NO_x$ reduced medium.

3. The system according to claim 2, wherein a second inlet of the second boiler unit is connected to a second outlet of the first boiler unit, and a second outlet of the second boiler unit is connected to a second inlet of the first boiler unit, to enable circulation of water between the second boiler unit and the first boiler unit.

4. The system according to claim 1, wherein the first boiler unit is fired.

5. The system according to claim 1, further comprising a temperature sensor for estimating a temperature of the medium before it enters the SCR reactor.

6. The system according to claim 5, further comprising a control unit arranged to communicate with the temperature sensor and control the first boiler unit in response to an output of the temperature sensor.

7. The system according to claim 1, wherein T3=360° C.

8. A ship comprising a system according to claim 1.

9. The system according to claim 1, wherein the first boiler unit comprises a second outlet at which liquid water is outputted from the boiler, a third outlet at which steam water is outputted from the first boiler unit, a first inlet at which fuel is introduced into the first boiler unit, and a second inlet at which liquid water and water steam are introduced into the first boiler unit.

10. The system according to claim 1, wherein the mixing unit is a pipe.

11. The system according to claim 10, wherein the pipe comprises baffles to facilitate mixing of the engine exhaust gas and the boiler exhaust gas.

12. The system according to claim 1, wherein
the engine exhaust gas has a temperature of between 200° C. and 340° when the engine exhaust gas is introduced into the mixing unit, and
the boiler exhaust gas has a temperature of between 360° C. and 400° C. when the boiler exhaust gas is introduced into the mixing unit.

13. A method of treating engine exhaust gas from an engine, which engine exhaust gas has a temperature between T1 and T2, the method comprising
receiving a medium containing the engine exhaust gas in an SCR reactor (Step O),
converting, in the SCR reactor, $NO_x$ contained in the medium into $N_2$ and $H_2O$ (Step P),
outputting, from the SCR reactor, the $NO_x$ reduced medium (Step Q),
outputting, from a first boiler unit, boiler exhaust gas having a temperature more than T3, T3>T1 (Step B),
introducing, in a mixing unit the engine exhaust gas and the boiler exhaust gas (Steps C and K), all of the engine exhaust gas introduced into the mixing unit from the engine and all of the boiler exhaust gas introduced into the mixing unit from the first boiler unit being entirely separated from one another before being introduced into the mixing unit such that all of the engine exhaust gas introduced into the mixing unit from the engine is first brought together with the boiler exhaust gas in the mixing unit,
mixing, in the mixing unit, the engine exhaust gas and the boiler exhaust gas to produce said medium (Step L), and
outputting, from the mixing unit, said medium (Step M).

14. The method according to claim 13, further comprising:
receiving the $NO_x$ reduced medium in a second boiler unit (Step R),
recovering, in the second boiler unit, heat from the $NO_x$ reduced medium (Step S), and
outputting, from the second boiler unit, the cooled $NO_x$ reduced medium (Step U).

15. The method according to claim 14, wherein a second inlet of the second boiler unit is connected to a second outlet of the first boiler unit, and a second outlet of the second boiler unit is connected to a second inlet of the first boiler unit, further comprising circulating water between the second boiler unit and the first boiler unit (Step T).

16. The method according to claim 13, further comprising estimating, by a temperature sensor, a temperature of the medium before it enters the SCR reactor (Step D).

17. The method according to claim 16, further comprising controlling the first boiler unit in response to an output of the temperature sensor (Steps E, F, G, H and I).

18. A ship comprising:
a diesel engine that produces engine exhaust gas containing $NO_x$ and having a temperature between T1 and T2, the diesel engine having an engine exhaust gas outlet;
a boiler comprising: a first inlet that receives fuel; a second inlet that receives water; and an outlet that outputs boiler exhaust gas at a temperature of T3 or more, wherein T3 is greater than T1;
a mixing unit comprising a first inlet directly connected to the engine exhaust gas outlet of the diesel engine to receive all of the engine exhaust gas outputted from the engine exhaust gas outlet so that all of the engine exhaust gas received in the mixing unit from the diesel engine is directly received from the diesel engine without passing through the boiler unit, the mixing unit also comprising a second inlet directly connected to the outlet of the boiler to receive the boiler exhaust gas outputted from the outlet of the boiler, the mixing unit mixing the engine exhaust gas containing the $NO_x$ with the boiler exhaust gas to produce a medium containing the $NO_x$, the mixing unit comprising an outlet to output the medium; and
a SCR reactor for converting the $NO_x$ contained in the medium into $N_2$ and $H_2O$, the SCR reactor having an inlet connected to the outlet of the mixing unit for receiving the medium containing the $NO_x$ from the outlet of the mixing unit, the SCR reactor also comprising an outlet for outputting the $NO_x$ reduced medium.

19. The ship according to claim 18, wherein the mixing unit is a pipe comprising baffles to facilitate mixing of the engine exhaust gas and the boiler exhaust gas.

20. The ship according to claim 18, wherein
the engine exhaust gas has a temperature between 200° C. and 340° when the engine exhaust gas is introduced into the mixing unit, and
the boiler exhaust gas has a temperature between 360° C. and 400° C. when the boiler exhaust gas is introduced into the mixing unit.

* * * * *